(12) United States Patent
Miyamoto

(10) Patent No.: US 6,532,464 B1
(45) Date of Patent: Mar. 11, 2003

(54) METHOD OF ASSESSING ENVIRONMENTAL LOAD AND APPARATUS OF DOING THE SAME

(75) Inventor: Shigeyuki Miyamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/328,463

(22) Filed: Jun. 9, 1999

(30) Foreign Application Priority Data

Jun. 10, 1998 (JP) .......................................... 10-162293

(51) Int. Cl.[7] .............................................. G06F 17/00
(52) U.S. Cl. ............................................. 707/10; 707/5
(58) Field of Search ..................... 707/1–206; 709/224; 711/163; 713/193

(56) References Cited

U.S. PATENT DOCUMENTS

| | | | | |
|---|---|---|---|---|
| 5,793,970 A | * | 8/1998 | Fakes et al. .................... | 707/1 |
| 5,802,511 A | * | 9/1998 | Kouchi et al. .................. | 707/1 |
| 6,427,140 B1 | * | 7/2002 | Ginter et al. ............... | 713/193 |
| 6,430,617 B1 | * | 8/2002 | Britt et al. ................... | 709/224 |
| 6,438,666 B2 | * | 8/2002 | Cassagnol et al. .......... | 711/163 |

FOREIGN PATENT DOCUMENTS

| | | |
|---|---|---|
| JP | 7-121588 | 5/1995 |
| JP | 7-129659 | 5/1995 |
| JP | 7-160613 | 6/1995 |
| JP | 7-311760 | 11/1995 |
| JP | 7-311792 | 11/1995 |
| JP | 8-87463 | 4/1996 |
| JP | 8-161399 | 6/1996 |
| JP | 9-16663 | 1/1997 |
| JP | 9-91587 | 9/1997 |
| JP | 10-40298 | 10/1998 |
| JP | 11-290832 | 11/1999 |

OTHER PUBLICATIONS

Sugawara et al., "Photoresist developer reclamation technology and system", Semiconductor Manufacturing Symposium, 2001 IEEE International, 2001, pp. 481–484.*

Yumoto e tal., "An evaluation system of logistic scenarios for withdrawl in the disposal of waste personal computers with RF–ID tag", Emerging technologies and Factory Automation, 2001, Proceedings 2001, 8t6h IEEE International Conference on, vol. 2, 2.*

Fujie et al., "A method to evaluate regional material flow for designing recycling society", Environmentally Conscious Design and Inverse Manufacturing, 2001, Proceedings EcoDesign 2001: Second International Symposium on, 201, pp. 974–979.*

Japanese Office Action, dated Jan. 24, 2001, with English language translation of Japanese Examiner's comments.

Japanese office action, with English translation 245307 dated Jul. 31, 2002.

* cited by examiner

*Primary Examiner*—David Jung
(74) *Attorney, Agent, or Firm*—Whitham, Curtis & Christofferson, PC

(57) ABSTRACT

There is provided a method of assessing total environmental load of an object product, including the steps of (a) collecting first data about environmental load at each of nodes relating to the object product, the first data including second data for retrieving data about environmental load of other node to which the each of nodes has a direct link, (b) retrieving the first data directly associated with the object product, in accordance with a predetermined condition, (c) recursively retrieving other first data about environmental load, based on second data included in the first data having been retrieved in the step (b), and (d) calculating total environmental load based on the first data having been retrieved in the steps (b) and (c). The method makes it possible to input data about environmental load with ease relative to a conventional method, and also to assess environmental load about a product comprised of a plurality of parts.

34 Claims, 13 Drawing Sheets

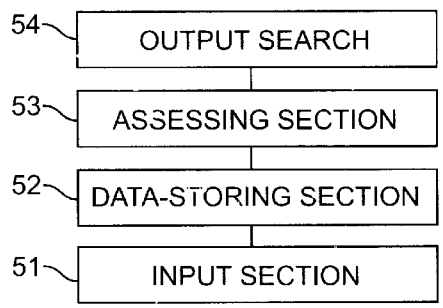

Figure 3
(PRIOR ART)

| NAME OF PRODUCT |
|---|
| PRODUCT DATA 1 |
| . . . |
| PRODUCT DATA L |
| NAME OF RAW MATERIAL 1 |
| . . . |
| NAME OF RAW MATERIAL m |
| ENVIRONMENTAL LOAD SUBJECT 1 |
| . . . |
| ENVIRONMENTAL LOAD SUBJECT n |
| ENVIRONMENTAL LOAD 1 |
| . . . |
| ENVIRONMENTAL LOAD n |

Figure 4A
(PRIOR ART)

| NAME OF PRODUCT |
|---|
| PRODUCT DATA 1 |
| . . . |
| PRODUCT DATA L |
| DECOMPOSITION 1 |
| . . . |
| DECOMPOSITION m |
| ENVIRONMENTAL LOAD SUBJECT 1 |
| . . . |
| ENVIRONMENTAL LOAD SUBJECT n |
| ENVIRONMENTAL LOAD 1 |
| . . . |
| ENVIRONMENTAL LOAD n |

Figure 4B
(PRIOR ART)

| ENVIRONMENTAL LOAD SUBJECT | AMOUNT | UNIT |
|---|---|---|
| $CO_2$ EMISSION | 1 | kg |
| BOD | 0.02 | kg |
| SOLID WASTE | 3 | kg |
| RESOURCE CONSUMPTION | 0.4 | kg |
| ENERGY CONSUMPTION | 5 | kWh |
| . . . | . . . | . . . |

*Figure 8*

| FIRST UNIT IDENTIFIER | |
|---|---|
| REFERENCE DATA | FIRST UNIT IDENTIFIER DATA 1 |
| | COEFFICIENT 1 |
| | . . . |
| | FIRST UNIT IDENTIFIER DATA m |
| | COEFFICIENT m |
| CHARACTERISTIC DATA | ENVIRONMENTAL LOAD SUBJECT 1 |
| | VALUE 1 |
| | UNIT 1 |
| | . . . |
| | ENVIRONMENTAL LOAD SUBJECT n |
| | VALUE n |
| | UNIT n |

Figure 14A

ENVIRONMENTAL LOAD ASSESSMENT SYSTEM

Designate data to be retrieved for a selected product
- Name of Manufacturer : ABC
- Name of Product : C123

PRODUCT DATA    STRUCTURE DATA    NODE DATA

Figure 14B

ENVIRONMENTAL LOAD ASSESSMENT SYSTEM

Determine a retrieval condition for the selected product
- Name of Manufacturer : ABC
- Name of Product : C123

STRUCTURE DATA: Select a part to be retrieved  [RETRIEVAL] [RETURN] [DATA]

| C123 |
| --- |
| ○ ALL |
| ⦿ Selection of Parts |
| ☑ HDD |
|     ☐ Part 1 |
|     ☐ Part 2 |
| ☐ FDD |
|     ☐ Part 1 |
|     ☐ Part 2 |
| ☐ Mother Board |
|     ☐ Part 1 |

ENVIRONMENTAL LOAD ASSESSMENT SYSTEM

Retrieval has been finished in line with the designated condition for the selected Product
- Name of Manufacturer : ABC
- Name of Product : C123

| C123 | RETRIEVAL RESULT | | | |
| --- | --- | --- | --- | --- |
| | $CO_2$ | CO | Cu | Pb |
| ○ ALL | | | | |
| ⦿ Selection of Parts | | | | |
| ☑ HDD | – | – | 15.0g | 114.0g |
| ☐ Part 1 | – | – | – | – |
| ☐ Part 2 | – | – | – | – |
| ☐ FDD | – | – | – | – |
| ☐ Part 1 | – | – | – | – |
| ☐ Part 2 | – | – | – | – |
| ☐ Mother Board | – | – | – | – |
| ☐ Part 1 | – | – | – | – |

[RETURN]

Figure 15A

ENVIRONMENTAL LOAD ASSESSMENT SYSTEM

Determine a retrieval condition for the selected product
⦿ Name of Manufacturer : ABC
⦿ Name of Product : C123
NODE DATA: Select a node to be retrieved  [RETRIEVAL] [RETURN] [DATA]

```
C123
⦿ ALL
○ Selection of Nodes
   ☐ Fabrication
      ☐ HDD
      ☐ FDD
      ☐ Mother Board
   ☐ Circulation
      ☐ Transporation
         by Automobile
      ☐ Transporation
         by Ship
   ☐ Use
      ☐ Use in Company
```

☑ CO2
☐ CO
☐ Cu
☐ Pb
☑ Power
☐ ---

Figure 15B

ENVIRONMENTAL LOAD ASSESSMENT SYSTEM

Retrieval has been finished in line with the designated condition for the selected Product
⦿ Name of Manufacturer : ABC
⦿ Name of Product : C123

| C123 | | | | | |
|---|---|---|---|---|---|
| ALL | | | | | |
| Subject / Unit | CO2 | CO | Cu | Pb | Power |
| Fabrication | 2.0kg | – | – | – | 12.0kWh |
| HDD Fabrication | – | – | – | – | – |
| HDD Assembling | – | – | – | – | – |
| FDD Fabrication | – | – | – | – | – |
| Mother Board Fabrication | – | – | – | – | – |
| Circulation | | | | | |
| Circulation by Automobile | – | – | – | – | – |
| Circulation by Ship | – | – | – | – | – |
| Use | – | – | – | – | – |
| Use in Company | – | – | – | – | – |

[RETURN]

METHOD OF ASSESSING ENVIRONMENTAL LOAD AND APPARATUS OF DOING THE SAME

BACKGROUND OF THE INVENTION

1. Field of the Invention

The invention relates to a method and an apparatus for assessing environmental load of a product, and more particularly to a method and an apparatus for assessing environmental load of a product over a lifetime thereof from fabrication to disposal thereof.

2. Description of the Related Art

It is presently required to accurately assess influence exerted by various products including industrial products, on an environment, and reduce environmental load, in view of preservation of the global environment.

Conventional assessment of environmental load of a certain product has been carried out by checking presence or absence and an amount of hazardous materials only in a part of steps of fabricating the product. However, such a conventional method cannot provide accurate assessment, if environmental load is to be assessed about an amount of carbon dioxide and waste heat, which is just small in each of fabrication steps, but cannot be ignored over all the fabrication steps.

In addition, environmental load cannot be ignored for some products in circulation, use and disposal thereof. However, the above-mentioned conventional method cannot be applied to such products.

In order to reduce environmental load, it would be necessary to design a product taking into consideration environmental load over a life cycle of a product from fabrication to disposal thereof. In order to make it possible to design a product in such a manner, it is necessary to quantify environmental load over a life cycle of a product. As a method of assessing environmental load over a life cycle of a product, there has been known a method called life cycle assessment (hereinafter, referred to simply as "LCA").

One of LCAs is a pile-up process, wherein a life cycle of a product from fabrication to disposal thereof is separated into nodes such as selection of raw material, fabrication of raw material, fabrication of a product, use of a product, and disposal of a product. All nodes are defined as being connected to one another in a line. Environmental load in each of nodes is separately measured, and the thus measured environmental loads are summed to thereby obtain total environmental load of an object product.

FIG. 1 illustrates an example of a model used in the above-mentioned pile-up process, which model is comprised of a plurality of nodes connected to one another in a line. FIG. 1 illustrates nodes relating to a product A. Namely, a node 60 of gathering raw material, a node 61 of making raw material, a node 62 of fabricating a product A, a node 63 of using a product A, and a node 64 of disposing a product A are all connected to a product A in a line.

For instance, Japanese Unexamined Patent Publication No. 7-121588 has suggested a method of assessing environmental load, based on life cycle assessment. In this method, there are calculated environmental load in fabrication nodes from gathering raw material to fabricating a final product, environmental load in practical use nodes wherein a product is sold in a market, and practically used by a user, and environmental load in waste nodes wherein a product is wasted and decomposed for recycling, and then, those environmental load are summed. Each of the environmental loads in both practical use and waste nodes is comprised of first load in each of the nodes and second load in steps of fabricating a product or products to be used in each of the nodes, and the first and second loads are both measured in the method. Furthermore, environmental load is measured based on both an input coefficient matrix obtained from an input-output table and a unit vector of environmental load.

The method suggested in Japanese Unexamined Patent Publication No. 7-121588 uses an input-output table which is used in economics, taking into consideration that it is quite difficult to find raw materials necessary for fabricating a final product, in every node.

If such a model as illustrated in FIG. 1 in which a plurality of nodes are connected to one another in a line is to be used, it would be almost impossible to assess environmental load of an electric or mechanical product constituted of a plurality of parts. Hence, the inventor has suggested a method of assessing environmental load of an object product in Japanese Unexamined Patent Publication No. 7-311760. In the suggested method, a relation between unit steps is represented in a tree structure where an object product is represented by a root, and a unit or single step is represented by a node. Such a tree structure is made for both steps relating to fabrication of the object product and steps of disposal of the object product. Total environmental load of the object product is calculated based on environmental load measured in each of unit steps.

FIG. 2 illustrates an example of a tree structure model. In the illustrated tree structure model, it is assumed that a product A is constituted of a part D and a part E. Nodes 72 and 75 of fabricating the parts D and E are located in parallel upstream of a node 71 of fabricating the product A. A node 74 of gathering raw material B of which the part D is constituted and a node 73 of transporting the raw material B are located upstream of the node 72 of fabricating the part D. Similarly, a node 77 of gathering raw material C of which the part E is constituted and a node 76 of transporting the raw material C are located upstream of the node 75 of fabricating the part E.

In the illustrated tree structure model, it is also assumed that the product A is decomposed into a decomposition F and a decomposition G. A node 78 of using the product A, a node 79 of transporting the product B, and a node 80 of decomposing the product A are located downstream of the product A. In addition, a node 81 of disposing the decomposition F and a node 82 of disposing the decomposition G are located in parallel downstream of the node 80 of decomposing the product A.

FIG. 3 is a block diagram of a structure of an apparatus for assessing environmental load, suggested in the above-mentioned Japanese Unexamined Patent Publication No. 7-311760. The illustrated apparatus is used for assessing influence to environment over a life cycle of a product from fabrication to disposal of an object product. As mentioned above, a life cycle of an object product is divided into unit nodes from fabrication to disposal. The illustrated apparatus measures environmental load in each of unit nodes, and sums the thus measured environmental loads to thereby calculate total environmental load of an object product.

As illustrated in FIG. 3, the apparatus is comprised of an input section 51 through which data used for calculation of environmental load is input, a data-storing section 52 storing data having been input through the input section 51, a calculating section 53 which calculates total environmental load of an object product, and an output section 54 which outputs data about each of unit steps and the thus calculated total environmental load of an object product.

The input section 51 receives data about content of each of unit steps, data about a relation among unit steps, environmental load subjects occurring in each of unit steps, and environmental loads in the environmental load subjects.

The data-storing section 52 stores the subjects and environmental loads having been input through the input section 51.

The calculating section 53 calculates total environmental load of an object product based on both a relation among unit steps, stored in the data-storing section 56 and environmental loads in each of unit steps.

FIG. 4A illustrates an example of data of a unit step relating to fabrication of an object product, stored in the data-storing section 56, and FIG. 4B illustrates an example of data of a unit step relating to disposal of an object product, stored in the data-storing section 56.

It is assumed that a product is composed of m raw materials in a target unit step in data illustrated in FIG. 4A. Data illustrated in FIG. 4A includes a name of the product, data 1-l about the product, including data about fabrication steps, names of the m raw materials, n names of environmental load subjects, and n environmental loads.

It is assumed that a product is decomposed into m decomposition materials in a target unit step in data illustrated in FIG. 4B. Data illustrated in FIG. 4A includes a name of the product, data 1-l about the product, including data about decomposition steps, names of the m decomposition materials, n names of environmental load subjects, and n environmental loads.

By storing data of every unit step, it is possible to describe a life cycle of an object product to be assessed, as a tree structure including a product as a center and fabrication and disposal nodes branching off from the product, and to calculate total environmental load of an object product, based on a relation among unit steps in the tree structure.

In addition, the above-mentioned apparatus for assessing environmental load makes it possible to reuse environmental loads in unit steps, measured to assess a certain product, for assessing environmental load of another product.

Japanese Unexamined Patent Publication No. 7-311792 has suggested an apparatus for assessing environmental load, including a computer-aided design (CAD) system, and a relational data base storing data about assembling and decomposing, and data about environment. According to the Publication, the suggested apparatus is superior in assembling and decomposing, and makes it possible to design a product exerting small load on environment.

Japanese Unexamined Patent Publication No. 9-16663 has suggested an apparatus of assessing environmental load having the same structure as that of the apparatus illustrated in FIG. 3, but further including a storing section for storing image data therein to thereby make it possible to facilitate to readily grasp each step, and to prevent an error in data input.

Japanese Unexamined Patent Publication No. 8-161399 has suggested an apparatus for assessing environmental load, including an input section through which basic data is input, a first memory storing the basic data having been input through the input section, a second memory storing a coefficient indicative of a degree to which a man exerts an influence on environment, means for calculating environmental capacity based on the basic data stored in the first memory and the coefficient stored in the second memory, and means for outputting a result of calculation.

However, the above-mentioned apparatuses of assessing environmental load are all accompanied with a problem that a step of inputting data about environmental load having been collected to assess environmental load is quite complicated. All of the above-mentioned apparatuses include a data base and the like, and stores data about environmental load into the data base.

Data about environmental load to be stored in the data base is generally collected in a line of fabricating products, a line of fabricating parts, and/or a line of wasting or recycling products. These lines at which data about environmental load is collected are separate away from one another, and are generally separate from a location at which assessment of environmental load is actually carried out by means of a data base.

Hence, such conventional apparatuses for assessing environmental load as mentioned above requires data to be transfer and to be input into a data base in the form of paper, resulting in that a step of storing data about environmental load cannot avoid being complicated. In particular, if environmental load of a product constituted of a mass of parts, such as an automobile and a personal computer, is to be assessed by means of the above-mentioned conventional apparatuses, work-volume of collecting data about environmental load becomes quite vast, and accordingly, it would not be practical to collect such data.

FIG. 5 illustrates a tree structure model of a life cycle of a personal computer. In FIG. 5, a rectangle having four sides of uniform thickness indicates a node, and a rectangle having upper and lower sides of greater thickness indicates a product.

A final step in fabrication of a personal computer is a step of assembling a body a hard disc drive (HDD), a substrate or mother board, and a power unit. Various steps such as a step of fabricating a hard disc drive and a power unit are located upstream of the step of fabricating a personal computer.

A step of disposing a used personal computer includes a step of dissembling a personal computer in open loop recycle and a step of recovering gold from integrated circuits (IC), and further includes a step of finally disposing a personal computer as a waste. When a personal computer is disposed as a waste, it is necessary to grasp an amount of material which might be poisonous in dependence on how it is disposed, such as lead (Pb). When gold is to be recovered, it would be necessary to grasp an amount of gold used in a personal computer. Thus, it is important to grasp an amount of constituents of an object product, such as gold and lead in the above-mentioned example, when environmental load is to be assessed.

Turning to fabrication of a present personal computer, a personal computer manufacturer may fabricate a body and a mother board by itself, but generally asks parts manufactures to fabricate a hard disc drive and a power unit. Though a personal computer manufacturer determines some items in a specification, such as performances of a hard disc drive and a power unit, other items are often entrusted to a part manufacturer.

Accordingly, a personal computer manufacturer is not familiar with parts actually used in a hard disc drive or a power unit, and hence, is not familiar also with power consumption and an amount of carbon dioxide in fabrication of a hard disc drive, and power consumption in fabrication of parts constituting a hard disc drive.

In addition, parts constituting a hard disc drive are often changed. For instance, configuration of a circuit is often varied, and parts constituting the circuit are often changed to other parts. Hence, even if a personal computer manufacturer could get data about the above-mentioned matters from a part manufacturer, it would be almost impossible for a personal computer manufacturer to collect data about environmental load in steps upstream of a step of fabrication of a personal computer, in order to carry out a life cycle assessment of a personal computer. If a personal computer manufacturer could get such data, it would be often old.

In order to carry out a life cycle assessment of a personal computer with respect to a step of disposal of a personal computer, it would be necessary to get data about steps upstream of a step of fabrication of a personal computer for recovering gold (Au) or grasping an amount of poisonous material such as lead (Pb).

In the end, since a conventional apparatus of assessing environmental load carries out assessment on the assumption that a manufacturer of an object product such as an automobile and a personal computer can collect and store all data about environmental load, the apparatus might not be able to carry out assessment for a product constituted of a lot of parts, because it would be much work-volume to collect all data about environmental load.

In brief, conventional apparatuses of assessing environmental load are accompanied with problems that procedure for inputting data about environmental load collected to make environmental load assessment is quite complicated, and that the conventional apparatuses cannot make environmental load assessment for a product constituted of a lot of parts, such as an automobile and a personal computer.

SUMMARY OF THE INVENTION

It is an object of the present invention to provide a method of assessing environmental load and an apparatus of doing the same, both of which can make environmental load assessment with ease relative to a conventional method and apparatus of doing the same, and can make environmental load assessment for a product constituted of a lot of parts, such as an automobile and a personal computer.

In one aspect, there is provided a method of assessing total environmental load of an object product, including the steps of (a) collecting first data about environmental load at each of locations at which nodes relating to the object product are to be carried out, and (b) retrieving the first data in accordance with a predetermined condition to thereby calculate the total environmental load.

There is further provided a method of assessing an amount of each of constituents of an object product, including the steps of (a) collecting first data about environmental load at each of locations at which nodes relating to the object product are to be carried out, and (b) retrieving the first data in accordance with a predetermined condition to thereby calculate the amount of each of constituents of an object product.

For instance, the first data may be retrieved through a network.

There is still further provided a method of assessing total environmental load of an object product, including the steps of (a) collecting first data about environmental load at each of nodes relating to the object product, the first data including second data for retrieving data about environmental load of other node to which the each of nodes has a direct link, (b) retrieving the first data directly associated with the object product, in accordance with a predetermined condition, (c) recursively retrieving other first data about environmental load, based on second data included in the first data having been retrieved in the step (b), and (d) calculating total environmental load, based on the first data having been retrieved in the steps (b) and (c).

There is yet further provided a method of assessing an amount of each of constituents of an object product, including the steps of (a) collecting first data about environmental load at each of nodes relating to the object product, the first data including second data for retrieving data about environmental load of other node to which the each of nodes has a direct link, and further including third data indicative of an amount of the each of constituents at the each of nodes, (b) retrieving the first data directly associated with the object product, in accordance with a predetermined condition, (c) recursively retrieving other first data about environmental load, based on second data included in the first data having been retrieved in the step (b), and (d) calculating an amount of the each of constituents, based on the first data having been retrieved in the steps (b) and (c).

In another aspect of the present invention, there is provided an apparatus for assessing total environmental load of an object product, including (a) a first unit collecting first data about environmental load at each of nodes relating to the object product, and (b) a second unit retrieving the first data stored in the first unit, and calculating total environmental load of the object product, based on the first data.

It is preferable that the first and second units are separate units from each other.

For instance, the first unit may be comprised of: (a) an input section through which the first data relating to associated node is input into the first unit, and (b) a data-storing section storing the first data having been input through the input section.

For instance, the second unit may be comprised of a data-retrieving section which retrieves the first data stored in the data-storing section.

As an alternative, the second unit may be comprised of: (a) an input section through which a condition for retrieving data is input into the first unit, (b) a data-retrieving section which retrieves data stored in the data-storing section of the first unit in accordance with the condition, (c) an assessing section which calculates total environmental load of the object product, based on the first data having been retrieved by the data-retrieving section, and (d) an output section which outputs the total environmental load.

There is further provided an apparatus for assessing an amount of each of constituents of an object product, including (a) a first unit collecting first data about environmental load at each of nodes relating to the object product, and (b) a second unit retrieving the first data stored in the first unit, and calculating the amount of each of constituents of the object product, based on the first data.

There is still further provided an apparatus for assessing total environmental load of an object product, including (a) a plurality of first units each collecting first data about environmental load at each of nodes relating to the object product, each of the first units being located at each of locations at which nodes relating to the object product are to be carried out, and (b) a single second unit retrieving the first data stored in each of the first units, and calculating total environmental load of the object product, based on the first data.

It is preferable that the second unit is separately located from the first units.

The apparatus may further include a network system through which the first units are connected to the second unit.

There is yet further provided an apparatus for assessing an amount of each of constituents of an object product, including (a) a plurality of first units each collecting first data about environmental load at each of nodes relating to the object product, each of the first units being located at each of locations at which nodes relating to the object product are to be carried out, and (b) a single second unit retrieving the first data stored in each of the first units, and calculating an amount of each of constituents of the object product, based on the first data.

There is still yet further provided an apparatus for assessing total environmental load of an object product, including (a) a plurality of first units each being located at each of nodes relating to the object product, and collecting first data about environmental load at each of the nodes, and (b) a second unit retrieving the first data stored in each of the first units, and calculating total environmental load of the object product, the first data including second data for retrieving data about environmental load of other node to which the each of nodes has a direct link, the second unit retrieving the first data directly associated with the object product, in accordance with a predetermined condition, and recursively retrieving other first data about environmental load, based on second data included in the first data having been retrieved, to thereby calculate total environmental load.

It is preferable that the apparatus further includes (a) a network system through which the first units are connected to the second unit, and (b) an address administration server connected to the network system, the address administration server dealing with a network address of one of the first units, based on the second data.

It is preferable that the second unit is comprised of (a) a data-storing section storing the first data therein, (b) a data-retrieving section retrieving the first data, and (c) an assessing section assessing the total environmental load, based on the second data included in the first data having been retrieved.

There is further provided an apparatus for assessing an amount of each of constituents of an object product, including (a) a plurality of first units each being located at each of nodes relating to the object product, and collecting first data about an amount of each of the constituents at each of the nodes, and (b) a second unit retrieving the first data stored in each of the first units, and calculating an amount of each of the constituents of the object product, the first data including second data for retrieving data about environmental load of other node to which the each of nodes has a direct link, the second unit retrieving the first data directly associated with the object product, in accordance with a predetermined condition, and recursively retrieving other first data about environmental load, based on second data included in the first data having been retrieved, to thereby calculate an amount of each of the constituents.

The advantages obtained by the aforementioned present invention will be described hereinbelow.

In accordance with the present invention, the apparatus of assessing environmental load is comprised of the first and second units, and the second unit may be designed to be able to retrieve data about environmental load stored in the first unit. As a result, it is possible to locate the first unit far away from the second unit, namely, it is possible to locate the first unit in a location where data about environmental load is to be collected, such as a line of fabricating a product, a line of fabricating a part, and a line of disposing or recycling a product. Thus, the apparatus of assessing environmental load in accordance with the present invention makes it possible to input or update data about environmental load with ease.

In addition, since the first unit can be independently controlled, data about environmental load can be readily updated, and hence, it would be possible to make environmental load assessment with accuracy, based on updated data about environmental load.

In accordance with the present invention, the first unit can be installed in a line of fabricating a product or a part or a line of disposing or recycling a product. Hence, it is possible automatically collect data about environmental load, resulting in that data about environmental load can be efficiently collected.

In accordance with the present invention, data about environmental load or first data may be designed to include the second data for retrieving data about environmental load in other node to which each of nodes has a direct link. When assessment of total environmental load is to be made, first data directly associated with an object product is retrieved in accordance with a predetermined condition, and other first data is recursively retrieved based on second data included in first data having been retrieved. Hence, even if different part manufacturers fabricate parts of the first unit, it is possible to swiftly and accurately calculate total environmental load without knowledge as to where data about environmental load in each of nodes is.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 3 is a block diagram of a conventional apparatus of assessing environmental load.

FIGS. 4A and 4B each illustrates an example of data stored in the apparatus illustrated in FIG. 3.

FIG. 8 illustrates an example of data stored in the apparatus illustrated in FIG. 7.

FIGS. 14A to 14C illustrate examples of displayed images in a screen.

FIGS. 15A to 15B illustrate examples of displayed images in a screen.

DESCRIPTION OF THE PREFERRED EMBODIMENTS

[First Embodiment]

Figure 1:
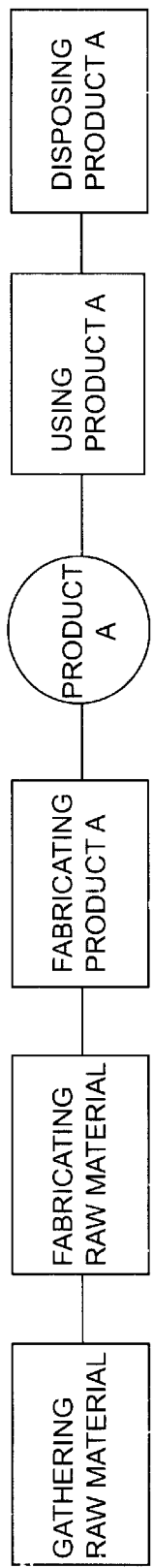
FIG. 1 illustrates an example of a model used in pile-up process in life cycle assessment.
Figure 2:
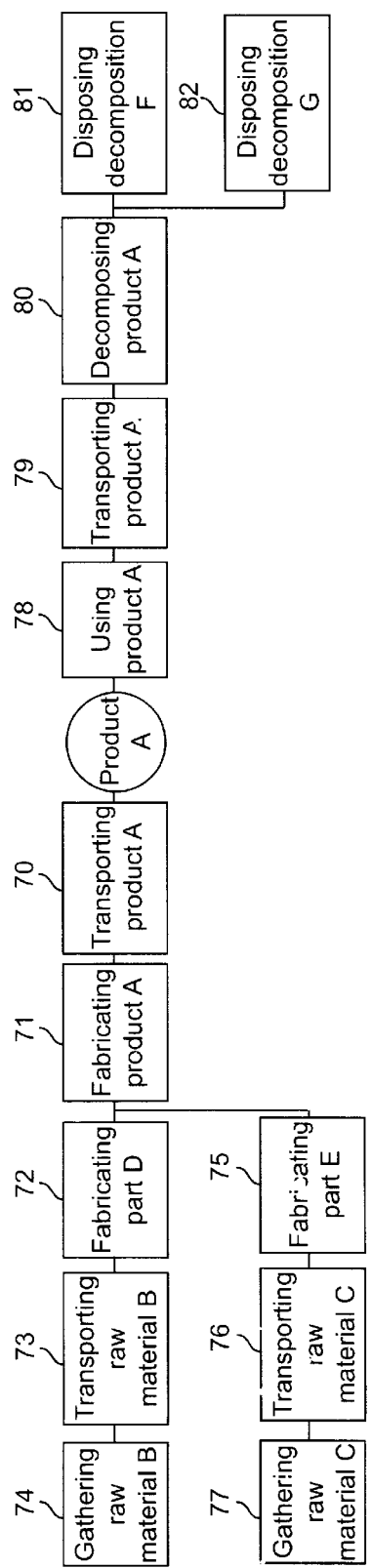
FIG. 2 illustrates an example of a conventional tree structure model.
Figure 5:
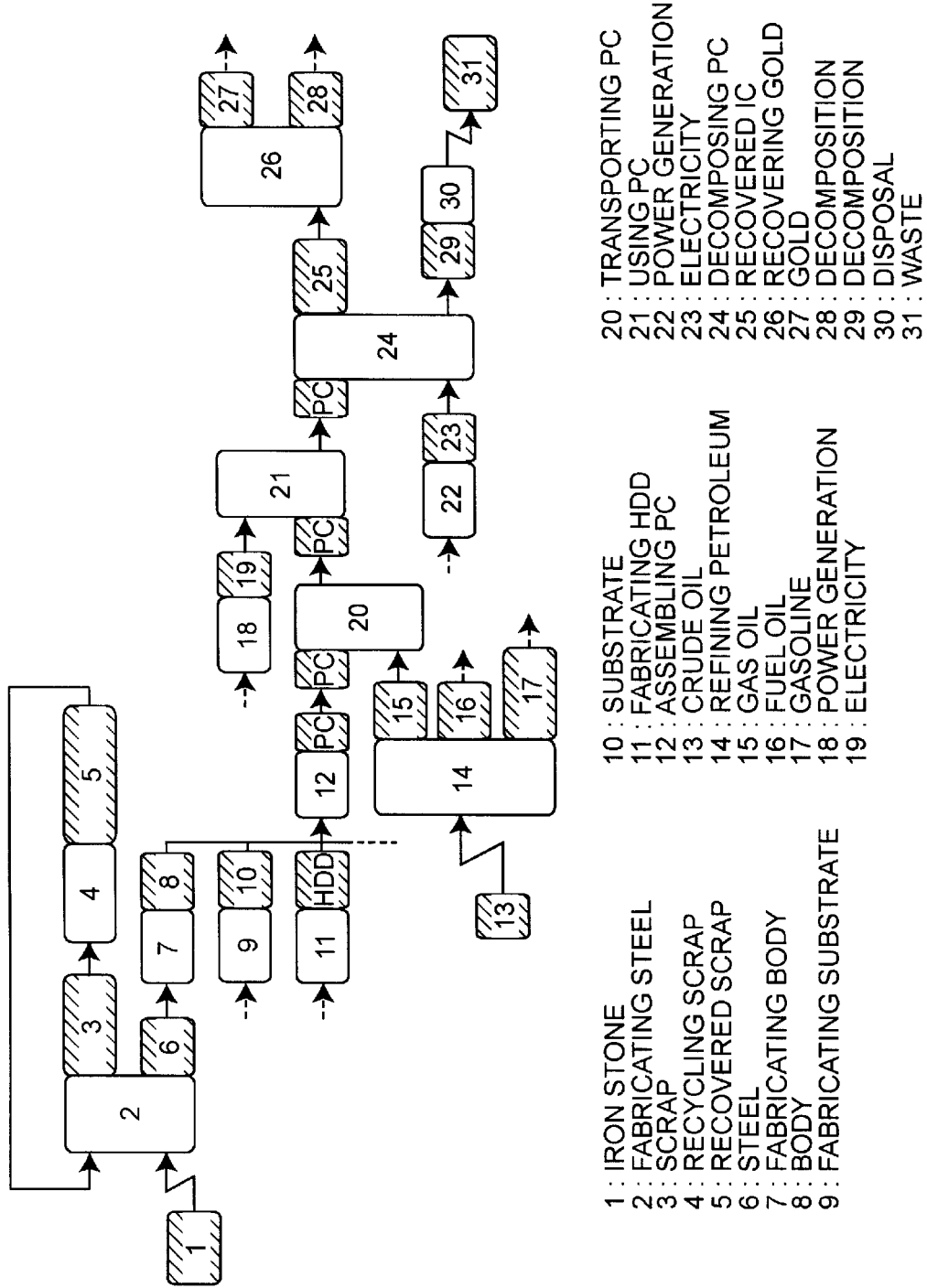
FIG. 5 illustrates a life cycle model of a personal computer, constructed by a conventional tree structure model.
Figure 6:
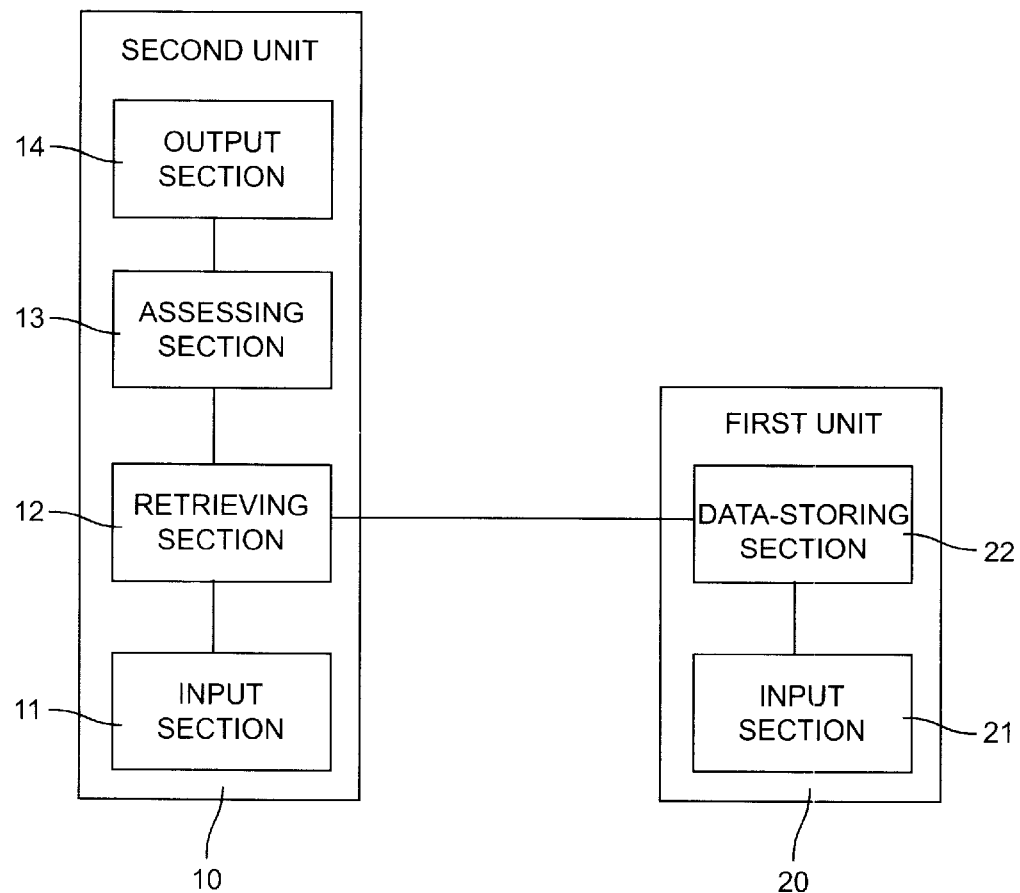
FIG. 6 is a block diagram of an apparatus of assessing environmental load in accordance with the first embodiment of the present invention.

FIG. 6 is a block diagram illustrating a structure of an apparatus of assessing environmental load in accordance with the first embodiment of the present invention.

The apparatus is comprised of a first unit 20 and a second unit 10. The first unit 20 is comprised of an input section 21 through which data about environmental load is input into the first unit 20, and a data-storing section 22 stores data about environmental load having been input through the input section 21. The second unit 10 is comprised of an input section 11 through which a condition for retrieval is input into the first unit 10, a retrieving section 12 which retrieves data about environmental load, an assessing section 13 which assesses environmental load, and an output section 14 which outputs a result of the assessment.

As illustrated in FIG. 6, the first and second units 20 and 10 are separate from each other. The retrieving section 12 of the first unit 10 is designed to be able to retrieve data stored in the data-storing section 22 of the first unit 20.

In the second unit 10, the input section 11 receives a condition for retrieving data used for assessing environmental load. The retrieving section 12 retrieves data stored in the data-storing section 22, in accordance with the condition having been input through the input section 11. The assessing section 13 carries out assessment about environmental load on an object product, based on a result transmitted from the retrieving section 12, to thereby calculate total environmental load of an object product. The output section 14 displays and outputs the total environmental load having been calculated by the assessing section 13.

The input section 21 of the first unit 20 receives data about environmental load to be used for assessing environmental load. The data-storing section 22 stores data about environmental load having been input through the input section 21.

The first unit 20 is placed at a location where data about environmental load is to be collected, such as a line of fabricating a product, a line of fabricating a part, and a line of disposing or recycling a product. In addition, it would be possible to automatically collect data about environmental load by equipping the first unit 20 to a fabrication, disposal or recycling equipment.

[Second Embodiment]

Figure 7:
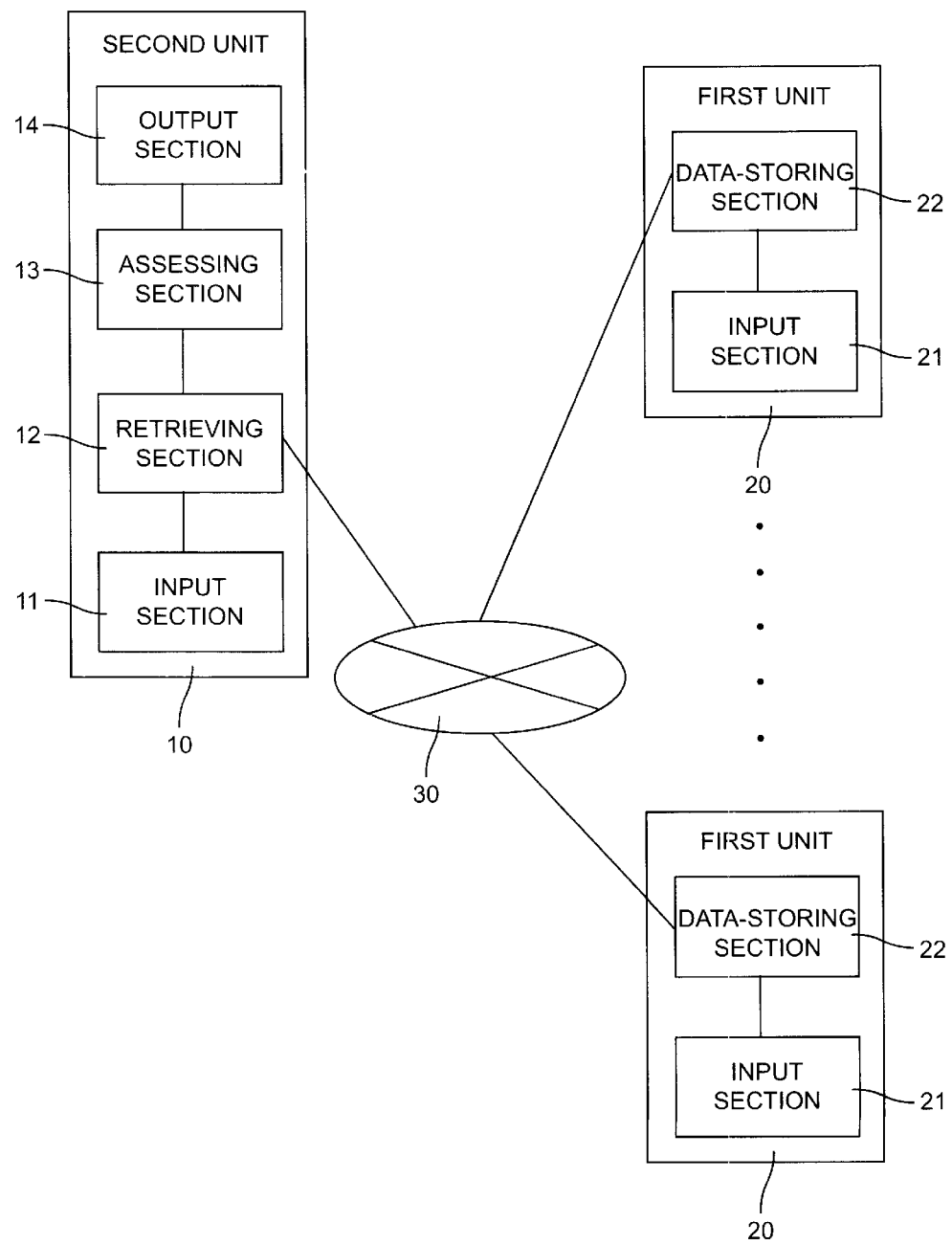
FIG. 7 is a block diagram of an apparatus of assessing environmental load in accordance with the second embodiment of the present invention.

FIG. 7 is a block diagram illustrating a structure of an apparatus of assessing environmental load in accordance with the second embodiment of the present invention.

The apparatus is comprised of a plurality of first units 20 and a single second unit 10. The first units 20 and the second unit 10 are connected to one another through a network system 30. The first and second units 20 and 10 have the same structure as those of the first and second units 20 and 10 in the first embodiment.

In the second embodiment, the first units 20 are places at a plurality of locations. For instance, the first units 20 are placed in a line of fabricating a product, a line of fabricating a part, and a line of disposing or recycling a product.

In operation, the retrieving section 12 of the second unit 10 retrieves and collects data about environmental load, stored in the storing sections 20 of the first units 20, through the network system 30, in accordance with a condition for retrieval having been input through the input section 10. The assessing section 13 calculates total environmental load of an object product, based on the thus collected data about environmental load.

Hereinbelow is explained an example of the above-mentioned first and second embodiments. In this example, an amount of carbon dioxide emitted in fabrication of a product is analyzed for making life cycle assessment (LCA).

FIG. 8 illustrates an example of data stored in the data-storing section 20 of the first unit 20. The data-storing section 22 stores environmental load subjects in each of locations at which environmental load is measured, values of such environmental load subjects, and a group of unit. The environmental load subjects include an amount of carbon dioxide, BOD (biochemical oxygen demand), an amount of solid waste, resource consumption, and energy consumption. The values of the environmental load subjects are input to the data-storing section 22 through the input section 21.

The apparatus of assessing environmental load in accordance with the first embodiment operates as follows for analyzing an amount of carbon dioxide generated in fabrication of a product.

With reference to FIG. 6, first, a condition for retrieval, an amount of carbon dioxide, is input to the input section 11 of the second unit 10. Then, the retrieving section 12 retrieves a value and a unit of an amount of carbon dioxide, both stored in the data-storing section 22 of the first unit 20. The result of retrieval is transmitted to the assessing section 13, and then, displayed in the output section 14.

The apparatus of assessing environmental load in accordance with the second embodiment operates as follows for analyzing an amount of carbon dioxide generated in fabrication of a product.

With reference to FIG. 7, first, a condition for retrieval, an amount of carbon dioxide, is input to the input section 11 of the second unit 10. At the same time, one or more first unit 20 in which data is to be retrieved is(are) designated. Then, the retrieving section 12 successively retrieves a value and a unit of an amount of carbon dioxide, both stored in the data-storing section 22 of the designated first unit(s) 20. The assessing section 13 sums the thus retrieved amount of carbon dioxide. Then, the result is displayed in the output section 14 of the second unit 10.

The apparatus of assessing environmental load in accordance with the above-mentioned first and second embodiments can make assessment on environmental load for an amount of air pollutants, an amount of water pollutants such as BOD, an amount of solid waste, resource consumption, and energy consumption, as well as an amount of carbon dioxide emission.

The apparatus of assessing environmental load in accordance with the above-mentioned first and second embodiments can also analyze an amount of raw materials or poisonous materials contained in a product as a part of other assessment of environmental load.

[Third Embodiment]

Figure 9:
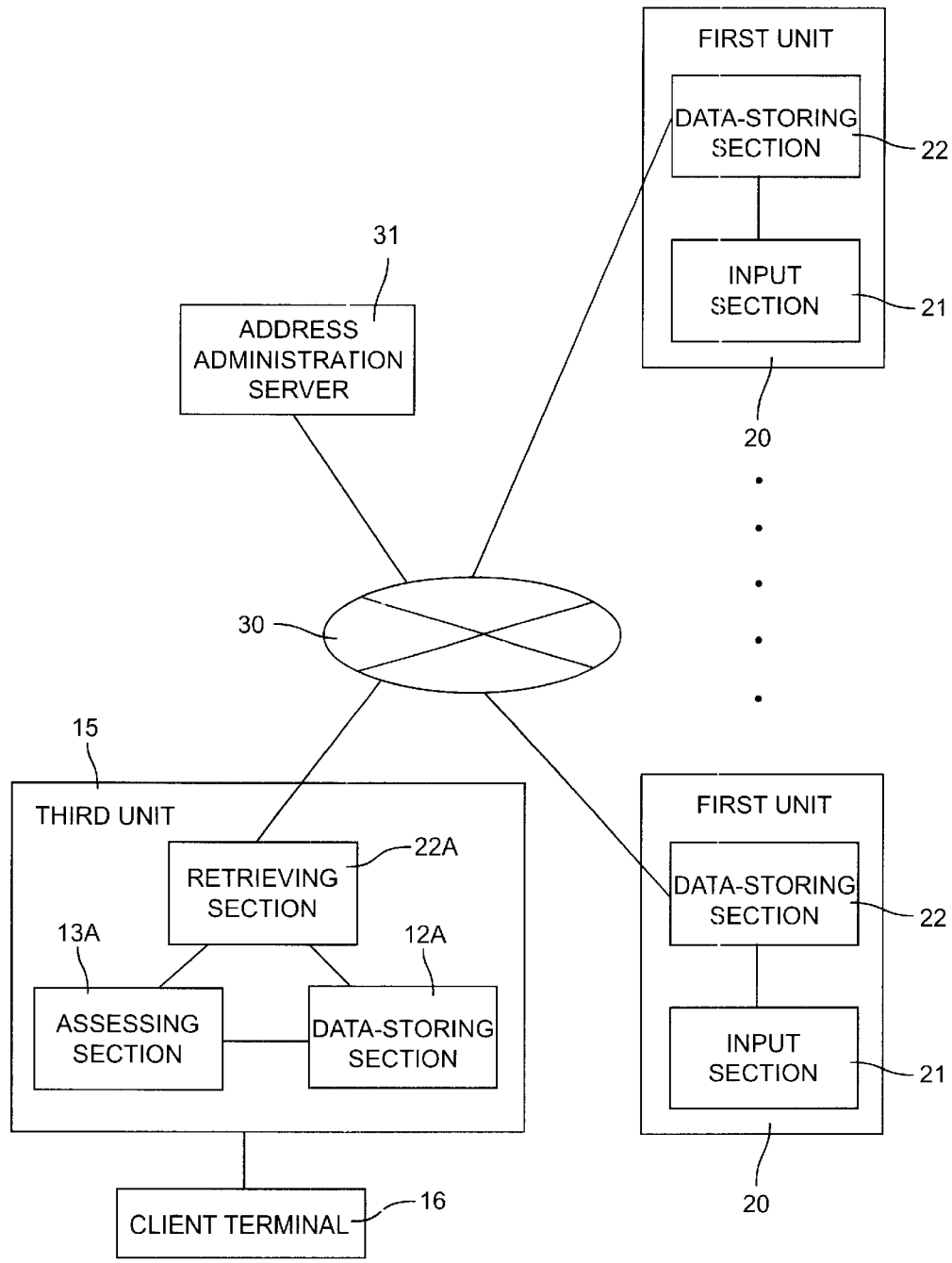
FIG. 9 is a block diagram of an apparatus of assessing environmental load in accordance with the third embodiment of the present invention.

FIG. 9 is a block diagram illustrating an apparatus of assessing environmental load in accordance with the third embodiment.

In the above-mentioned second embodiment, when the second unit 10 retrieves data about environmental load from a plurality of the first units 20 through the network system 30, it is premised that the second unit 10 knows which first unit stores data about environmental load that the second unit 10 intends to retrieve. However, as mentioned earlier, it is quite difficult to know in advance which first unit stores requisite data about environmental load, when assessment of environmental load is to be made for a product constituted of a lot of parts, such as an automobile and a personal computer. For instance, in fabrication of a personal computer, though a personal computer manufacturer knows a source of a hard disc drive and a power unit to be equipped in a personal computer which the personal computer manufacturer fabricates, and power consumption required for assembling a personal computer, the personal computer manufacturer does not know sources of individual parts constituting a hard disc drive, and hence, does not know where first units associated with individual parts are located.

In the third embodiment, when assessment of environmental load is to be made on a certain product, data about environmental load is collected to a degree an operator knows. For instance, a manufacturer of a product would know a first source of parts and power consumption. Then, based on data included in the thus collected data about environmental load, data about environmental load in the next stages are collected. This step is repeated to thereby collect all requisite data about environmental load, necessary for making assessment of environmental load.

With reference to FIG. 9, the apparatus of assessing environmental load in accordance with the third embodiment is comprised of a plurality of first units 20 and a single third unit 15. The first units 20 are connected to the third unit 15 through which a network system 30 to which an address administration server 31 is connected.

Each of the first units 20 has the same structure as the structure of the first unit 20 in the first embodiment. The third unit 15 is comprised of a data-storing section 12a storing therein data about environmental load, a data-retrieving section 22a retrieving data stored in the data-storing section 12a, and an assessing section 13a assessing data having been retrieved by the data-retrieving section 22a.

A terminal 16 of a client is electrically connected to the third unit 15. A condition for retrieval and data about environmental load are input into the third unit 15 through the client terminal 16, and a result of retrieval is output to the client terminal 16.

The illustrated apparatus of assessing environmental load is designed to include a single third unit 15, but it should be noted that the apparatus may be designed to include a plurality of the third units 15.

The third unit 15 is equivalent in function to a combination of the first and second unit 20 and 10 having been explained in the first embodiment.

As will be obvious for those skilled in the art in view of the explanation having been made so far, the apparatus of assessing environmental load in accordance with the third embodiment is equivalent in function to the apparatus in accordance with the first embodiment.

The data-retrieving section 22a retrieves the data-storing section 12a of the third unit 15 and the data-storing sections 22 of the first units 20 in accordance with the received condition for retrieval to thereby get requisite data about environmental load.

The data-retrieving section 22a acts as a retrieving robot for carrying out retrieval on the network 30. That is, the data-retrieving section 22a has a function of retrieving next data about environmental load, based on reference data or link data included in the retrieved data about environmental load.

The assessing section 13a carries out assessment of environmental load on an object product, based on the result of retrieval having been carried out by the data-retrieving section 22a.

The data-storing section 12a stores therein data about environmental load, received from the client terminal 16.

The client terminal 16 may be comprised of an ordinary personal computer, for instance.

The address administration server 31 solves a network address in the same manner as that of a domain name system (DNS) server which is used to extract IP address from a domain name when a communication is to be made on internet through transmission control protocol/internet protocol (TCP/IP). In the third embodiment, different network addresses are assigned to the third unit 15 and the first units 20. The address administration server 31 extracts a network address from first unit data included in data about environmental load. In the instant embodiment, an operator can selectively connect the third and first units 15 and 20 to the network system 30 by his/her intention. However, it is preferable that a certain organization assigns a network address to an operator in order to avoid duplication in a network address or a later mentioned first unit identifier, similarly to a case where a World Wide Web (WWW) server is connected to Internet.

For instance, the third unit 15 may be placed in an office where assessment of environmental load is to be made, and the first units 20 may be placed in a line of fabricating an object product, in a manufacturer of parts and raw material of an object product, in a line of disposing or recycling an object product, or in a waste disposer of an object product. In the instant embodiment, a part manufacture where the first unit 20 is to be placed includes a manufacturer of a part used in a part directly used for fabrication of an object product, and a manufacturer of a part located upstream of the firstly mentioned part, as well as a manufacturer of a part directly used for fabrication of an object product. The first units 20 are placed also at stages downstream of an object product, namely, in a first waste-disposer to a final waste-disposer.

Since the third unit 15 has the same function as the function of the first unit 20, the third unit 15 may be placed in place of the first unit 20.

At least one of the third and first units 15 and 20 is placed in association with all nodes in a tree structure model for life cycle assessment.

Though it seems that arrangement of the first units 20 in a plurality of locations costs much, the first units 20 are placed not for obtaining data about environmental load of a particular product, but for obtaining data about environmental load for each of nodes in the assumption that nodes of fabricating, processing, transporting and disposing a product are carried out at locations where the first units 20 are placed.

Hence, a common first unit 20 can be used, if products experience the same node, even though the products are different from one another. This means that assessment of environmental load on various products can be readily carried out, if the first units 20 are placed entirely in a certain area.

As is obvious in view of a later mentioned method, it is not always necessary for the third unit 15 to in advance know addresses of all the first units 20 for carrying out assessment of environmental load, and to know in advance existence of the first units 20. The instant embodiment makes it possible to get all requisite data about environmental load only by retrieved data about environmental load and address solution accomplished by the address administration server 31, when environmental load assessment is to be actually carried out.

Figures 10, 11:
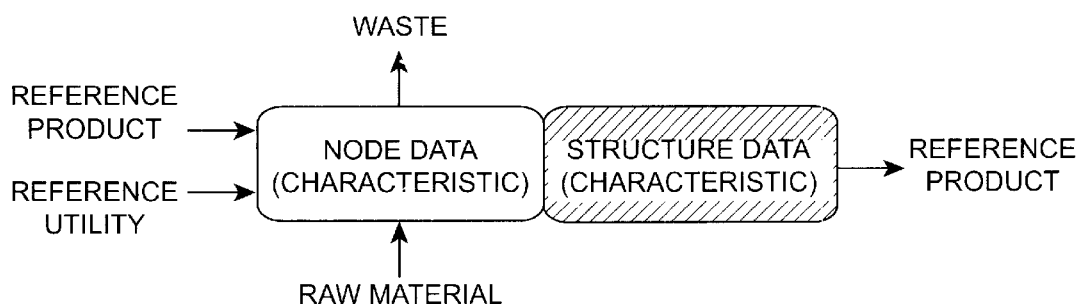
FIG. 10 illustrates an example of data stored in the apparatus illustrated in FIG. 9.
FIG. 11 illustrates a model of a node.

FIG. 10 illustrates an example of data stored in the data-storing sections 22 and 12a. Each data is identified with a first unit identifier. Data is grouped into reference data and characteristic data. The first unit identifier is assigned to each of the first and third units 20 and 15 in order to distinguish them from one another. The first unit identifier is comprised of a figure and/or a row of letters.

The reference data includes a relation with other first unit 20 or third unit 15. The reference data is comprised of a combination of a first unit identifying data and a coefficient. An identifier assigned to other first or third unit 20 or 15 is stored as the first unit identifying data, and a figure indicative of a degree of contribution of data about environmental load stored in the first unit is stored as the coefficient.

For instance, it is now assumed that a product A is constituted of three parts B. The first units 20 located in a line of fabricating the product A stores "B" as the first unit identifier, and further stores "3" as the coefficient. These first unit identifier and coefficient means that the number of the first units relating to the part B, which collects data about environmental load, is three.

The characteristic data includes data about environmental load. For instance, environmental load subjects such as an amount of carbon dioxide, BOD (biochemical oxygen demand), an amount of solid waste, resource consumption, energy consumption, and content of material which may be poisonous, such as lead, values of the environmental load subjects, and a unit of the values are stored as the characteristic data.

FIG. 11 illustrates a model of the nodes in the instant embodiment. Each of the nodes is separated into node data and structure data.

The node data includes data relating to raw material, emission in a node, such as carbon dioxide, and material which is not contained in a product resulting from a node, but is used in the node, such as reference product and reference utility to be input into the node. For instance, an example of the lastly mentioned material is solvent for washing.

The structure data includes data about a structure of a reference product which is an output from a node. For instance, the structure data includes data as to how much weight of iron is contained in kilogram, or how much weight of lead is contained in gram.

In the instant embodiment, the data-storing sections 22 and 12a stores the above-mentioned node data and structure data as the characteristic data.

Figure 12:
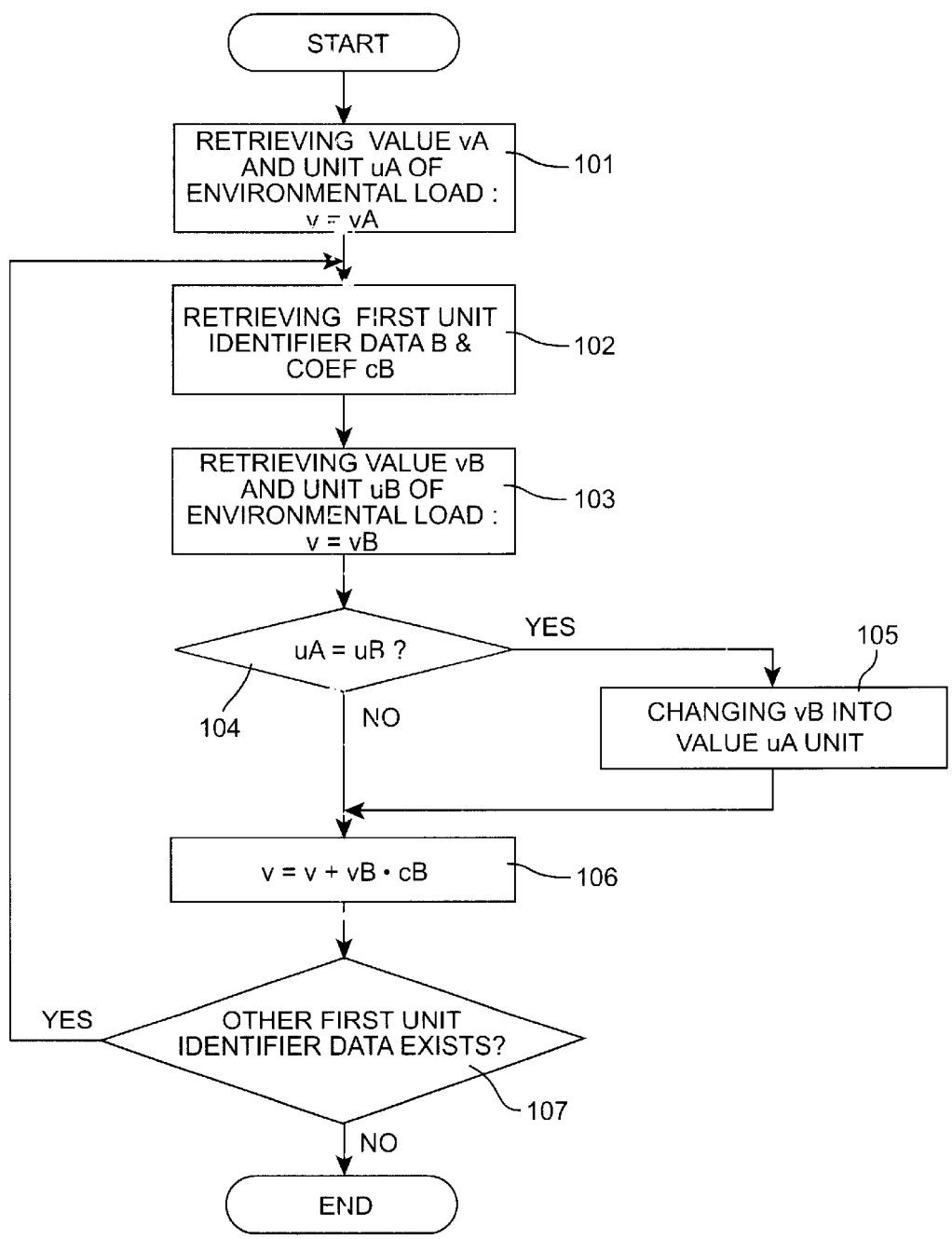
FIG. 12 is a flow chart of a method of analyzing environmental load.

Hereinbelow, steps of analyzing environmental load, to be carried out in the apparatus of assessing environmental load, are explained with reference to FIG. 12.

First, a first unit A storing data about environmental load of an object product A is retrieved to thereby obtain data indicative of a value vA and a unit uA of environmental load such as carbon dioxide emission, in step 101.

Then, a first unit identifier data B and a coefficient cB both included in data about environmental load of the product A, stored in the first unit A, are retrieved, in step 102.

Then, a value vB and a unit uB of environmental load are retrieved in another first unit B which is designated by the retrieved first unit identifier data B, in step 103.

Since the first unit is placed in each of locations, there is possibility that the first units may have different units of a value. Hence, it is checked as to whether the unit uA is equal to the unit uB, in step 104.

If the unit uA is not equal to the unit uB (NO in step 104), the value vB is changed into a value in the unit uA, in step 105.

Then, environmental load v is calculated in step 106 in accordance with the following equation.

$$V = vA + vB \times cB$$

Then, it is checked as to whether the first unit B stores therein another combination of first unit identifier data and a coefficient, in step 107. If such another combination is not stored in the first unit B (NO in step 107), the procedure ends. If such another combination is stored in the first unit B (YES in step 107), returning back to step 102, other first units are recursively retrieved.

The above-mentioned procedure is carried out for all combinations of first unit identifier data and a coefficient, stored in the first unit A. As a result, total environmental load of the product A can be calculated.

Figure 13:
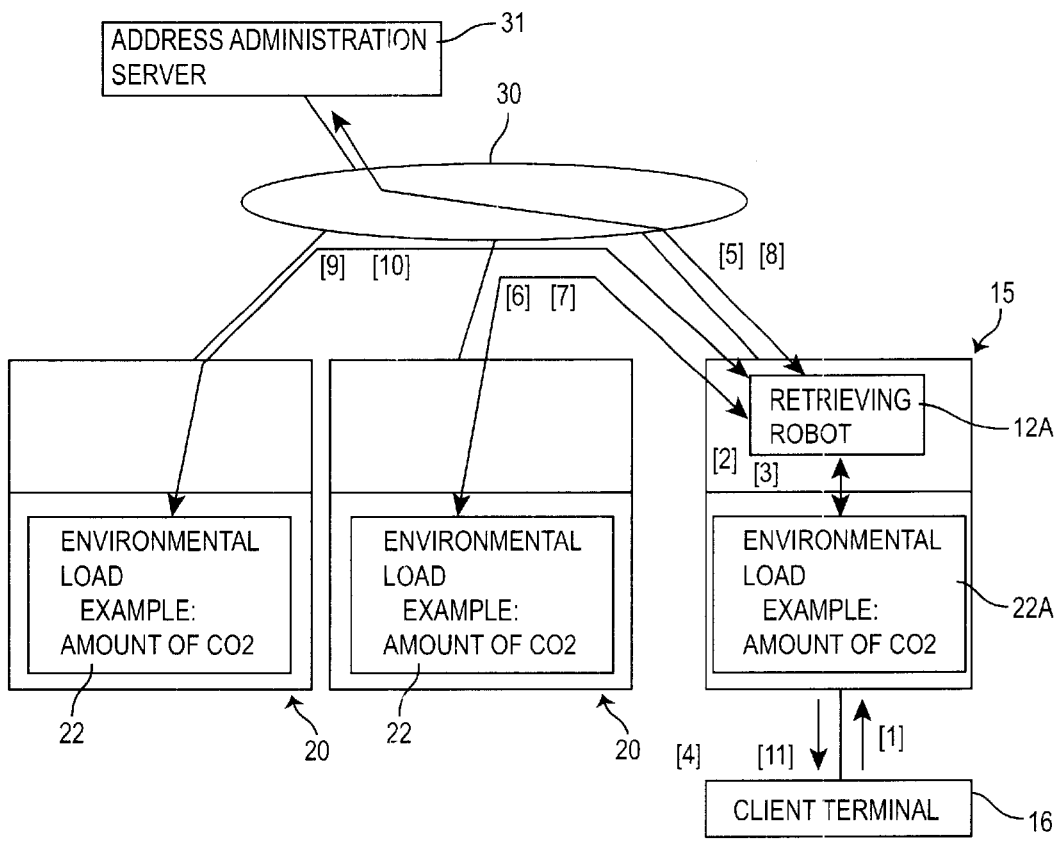
FIG. 13 illustrates a model of a system for assessing environmental load through a network system.

Hereinbelow the above-mentioned procedure is detailed in an example in which an amount of carbon dioxide ($CO_2$) emission produced in fabrication of a product is measured, with reference to FIG. 13. In FIG. 13, figures sandwiched between brackets [ ] indicate an order of steps in the procedure, arrows represented in a wide line indicate retrieval operation of an amount of carbon dioxide to be carried out by the retrieving section 12a, and arrows represented in a thin line indicate other retrieval operations and data input/output operation.

First, the third unit 15 receives a condition for retrieval from the client terminal 16 in step [1]. In this example, the condition for retrieval is an amount of carbon dioxide emission. In response to receipt of the condition for retrieval, the retrieving section 12a of the third unit 15 retrieves the data-storing section 22a in step [2], to thereby obtain an amount of carbon dioxide emission as data about environmental load in step [3].

If an amount of carbon dioxide emission could be obtained at this stage, data indicative of the amount is returned to the client terminal 16 in step [4]. However, in general, an amount of carbon dioxide emission in entire fabrication steps cannot be obtained. Hence, the retrieving section 12a refers to first unit identifier data included in data about environmental load having been obtained in step [3], and inquires the address administration server 31 a network address of the first unit 20 associated with the first unit identifier data, in step [5]. Then, the retrieving section 12a retrieves the data-storing section 22 of the first unit 20 identified by the address administration server 31, in step [6], to thereby obtain an amount of carbon dioxide emission produced in the first unit 20, in step [7].

The same procedure as mentioned above is repeated in other first units 20 in steps [8] to [10] to thereby obtain an amount of carbon dioxide emission produced in entire fabrication of an object product. The thus obtained amount of carbon dioxide emission is transferred to the client terminal 16 from the third unit 15 in step [11]. Thus, a cycle of the procedure ends.

In the above-mentioned example, an amount of carbon dioxide emission produced in entire fabrication steps of an object product is measured. In the same way, it is possible to measure an amount of carbon dioxide emission produced in disposal of an object product, and an amount of carbon dioxide emission produced in fabrication of a particular part constituting an object product. In addition, environmental load with respect to environmental load subjects other than an amount of carbon dioxide emission can be obtained in the same manner as mentioned above.

In a case where the first units 20 are placed in a plurality of part manufacturers, and each of the part manufacturers fabricates a plurality of kinds of parts, it would be logically necessary to place the first unit 20 for every part or in every node, but it would be preferable to place a limited number of the first units 20 in each of part manufacturers.

In addition, it is necessary for first unit identifier data and first unit identifier in plurality of manufacturers not to be contradictory among one another. Hence, it is preferable for first unit identifier data and first unit identifier to include a name of a manufacturer and a number of a product, which ensures that the greater number of parts and nodes can be dealt with by the less number of the first units. Thus, when a limited number of the first units is placed in each of manufacturers, it is preferable that the first units are physically identified through a network address, and are logically identified through a first unit identifier.

In the third embodiment, there is used a model illustrated in FIG. 11, which includes node data and structure data. The structure data can be designed to include data about how much weight of valuable recoverable material such as gold is contained, and/or data about how much weigh of material such as lead which might be poisonous in dependence on how it is disposed is contained. Hence, the environmental load subjects may include gold, lead and so on. As a result, it would be possible to estimate an amount of recoverable gold in a product to be disposed, and an amount of lead contained in waste.

Hereinbelow, an example of inputting a condition for retrieval to the client terminal 16 and displaying a retrieval result is explained. The client terminal 16 in the third embodiment is designed to input data into other terminals and display received data through graphical user interface (GUI).

FIG. 14A illustrates a scope through which one of environmental loads is selected. In the illustrated scope, a name of a manufacture is "ABC" and a name of a product is "C123", and one of product data, structure data and node data can be selected through the scope. Herein, it is assumed that the product "C123" is a personal computer. The legend "Environmental Load Assessment System" located at the uppermost of the scope is a name of an apparatus of assessing environmental load and is a title of this scope.

Selection can be made by clicking a desired subject by means of a pointing device such as a mouse.

The product data relates to steps of fabricating and decomposing an object product. The structure data relates to constituent(s) of which an object product is composed, namely, content of an object product. The node data relates to material(s) which is not contained in an object product, but used in or disposed from steps of fabricating an object product. The structure and node data shown in FIG. 14A correspond to the structure and node data in the model illustrated in FIG. 12.

It is now assumed that the structure data is selected in the scope illustrated in FIG. 14A. Then, there appears a scope illustrated in FIG. 14B. A condition for retrieval is selected through the scope illustrated in FIG. 14B. If "All" is selected, structure data for an object product in its entirety is retrieved. On the other hand, if "Selection of Parts" is selected and then one of listed parts is selected, structure data about the thus selected part is retrieved.

For instance, if "HDD" is selected and then "Part 1" and "Part 2" are selected, structure data about "Part 1" and "Part 2" constituting HDD is retrieved.

A right side portion of the scope is an area for selecting an environmental load subject to be retrieved. In the scope illustrated in FIG. 14B, a part "HDD", "Cu" and "Pb" are selected. This means that data about amounts of copper (Cu) and lead (Pb) both contained in HDD are to be retrieved. Clicking a button labeled "Retrieval", retrieval is carried out in accordance with the above-mentioned procedure.

When retrieval has finished, there appears a scope for displaying a retrieval result, as illustrated in FIG. 14C. The scope illustrated in FIG. 14C shows that the part "HDD" contains copper by 15 grams and lead by 114 grams.

When "Node Data" is selected in the scope illustrated in FIG. 14A, there appears such a scope as illustrated in FIG. 15A. Similarly to the above-mentioned structure data, it is possible to select an amount of object material in all steps or in a particular step(s), and further select an environmental load subject to be retrieved. The scope illustrated in FIG. 15A shows that data about both an amount of carbon dioxide emission and power consumption in all fabrication steps is to be retrieved.

FIG. 15B illustrates a scope in which a result of the above-mentioned retrieval is displayed. The scope illustrated in FIG. 15B shows that an amount of carbon dioxide emission is 2 kilograms, and power consumption is 12.0 kWh per a product throughout all steps of fabricating an object product.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-162293 filed on Jun. 10, 1998 including specification, claims, drawings and summary is incorporated herein by reference in its entirety.

What is claimed is:

1. A method of assessing total environmental load of an object product, comprising the steps of:
   (a) collecting first data about environmental load at each of locations at which nodes relating to said object product are to be carried out; and
   (b) retrieving said first data in accordance with a predetermined condition to thereby calculate said total environmental load, wherein first units for obtaining said first data are placed at said locations not for obtaining data about environmental load of said object product but for obtaining data about environmental load for said nodes, wherein said locations where said first units are placed include nodes of fabricating, processing, transporting, and disposing said object product.

2. The method as set forth in claim 1, wherein said first data is retrieved through a network.

3. A method of assessing an amount of each of constituents of an object product, comprising the steps of:
   (a) collecting first data about environmental load at each of locations at which nodes relating to said object product are to be carried out; and
   (b) retrieving said first data in accordance with a predetermined condition to thereby calculate said amount of each of constituents of an object product, wherein first units for obtaining said first data are placed at said locations not for obtaining data about environmental load of said object product but for obtaining data about environmental load for said nodes, wherein said locations where said first units are placed include nodes of fabricating, processing, transporting, and disposing said object product.

4. The method as set forth in claim 3, wherein said first data is retrieved through a network.

5. A method of assessing total environmental load of an object product, comprising the steps of:
   (a) collecting first data about environmental load at each of nodes relating to said object product, said first data including second data for retrieving data about environmental load of other node to which said each of nodes has a direct link;
   (b) retrieving said first data directly associated with said object product, in accordance with a predetermined condition;

(c) recursively retrieving other first data about environmental load, based on second data included in said first data having been retrieved in said step (b); and (d) calculating total environmental load, based on said first data having been retrieved in said steps (b) and (c), wherein first units for obtaining said first data are placed at said nodes not for obtaining data about environmental load of said object product but for obtaining data about environmental load for said nodes, wherein said nodes where said first units are placed include nodes of fabricating, processing, transporting, and disposing said object product.

6. A method of assessing an amount of each of constituents of an object product, comprising the steps of:

(a) collecting first data about environmental load at each of nodes relating to said object product, said first data including second data for retrieving data about environmental load of other node to which said each of nodes has a direct link, and further including third data indicative of an amount of said each of constituents at said each of nodes;

(b) retrieving said first data directly associated with said object product, in accordance with a predetermined condition;

(c) recursively retrieving other first data about environmental load, based on second data included in said first data having been retrieved in said step (b); and (d) calculating an amount of said each of constituents, based on said first data having been retrieved in said steps (b) and (c), wherein first units for obtaining said first data are placed at said nodes not for obtaining data about environmental load of said object product but for obtaining data about environmental load for said nodes, wherein said nodes where said first units are placed include nodes of fabricating, processing, transporting, and disposing said object product.

7. An apparatus for assessing total environmental load of an object product, comprising:

(a) a first unit collecting first data about environmental load at each of nodes relating to said object product; and (b) a second unit retrieving said first data stored in said first unit, and calculating total environmental load of said object product, based on said first data, wherein said first unit for collecting said first data is placed at said nodes not for obtaining data about environmental load of said object product but for obtaining data about environmental load for said nodes, wherein said nodes where said first unit is placed include nodes of fabricating, processing, transporting, and disposing said object product.

8. The apparatus as set forth in claim 7, wherein said first and second units are separate units from each other.

9. The apparatus as set forth in claim 7, wherein said first unit is comprised of: (a) an input section through which said first data relating to associated node is input into said first unit; and (b) a data-storing section storing said first data having been input through said input section.

10. The apparatus as set forth in claim 9, wherein said second unit is comprised of a data-retrieving section which retrieves said first data stored in said data-storing section.

11. The apparatus as set forth in claim 9, wherein said second unit is comprised of: (a) an input section through which a condition for retrieving data is input into said first unit; (b) a data-retrieving section which retrieves data stored in said data-storing section of said first unit in accordance with said condition; (c) an assessing section which calculates total environmental load of said object product, based on said first data having been retrieved by said data-retrieving section; and (d) an output section which outputs said total environmental load.

12. An apparatus for assessing an amount of each of constituents of an object product, comprising:

(a) a first unit collecting first data about environmental load at each of nodes relating to said object product; and (b) a second unit retrieving said first data stored in said first unit, and calculating said amount of each of constituents of said object product, based on said first data, wherein said first unit for collecting said first data is placed at said nodes not for obtaining data about environmental load of said object product but for obtaining data about environmental load for said nodes, wherein said nodes where said first unit is placed include nodes of fabricating, processing, transporting, and disposing said object product.

13. The apparatus as set forth in claim 12, wherein said first and second units are separate units from each other.

14. The apparatus as set forth in claim 12, wherein said first unit is comprised of: (a) an input section through which said first data relating to associated node is input into said first unit; and (b) a data-storing section storing said first data having been input through said input section.

15. The apparatus as set forth in claim 14, wherein said second unit is comprised of a data-retrieving section which retrieves said first data stored in said data-storing section.

16. The apparatus as set forth in claim 14, wherein said second unit is comprised of: (a) an input section through which a condition for retrieving data is input into said first unit; (b) a data-retrieving section which retrieves data stored in said data-storing section of said first unit in accordance with said condition; (c) an assessing section which calculates said amount of each of constituents of said object product, based on said first data having been retrieved by said data retrieving section; and (d) an output section which outputs said amount of each of constituents of said object product.

17. An apparatus for assessing total environmental load of an object product, comprising:

(a) a plurality of first units each collecting first data about environmental load at each of nodes relating to said object product, each of said first units being located at each of locations at which nodes relating to said object product are to be carried out; and (b) a single second unit retrieving said first data stored in each of said first units, and calculating total environmental load of said object product, based on said first data, wherein said first units for obtaining said first data are placed at said nodes not for obtaining data about environmental load of said object product but for obtaining data about environmental load for said nodes, wherein said nodes where said first units are placed include nodes of fabricating, processing, transporting, and disposing said object product.

18. The apparatus as set forth in claim 17, wherein said second unit is separately located from said first units.

19. The apparatus as set forth in claim 17, further comprising a network system through which said first units are connected to said second unit.

20. The apparatus as set forth in claim 17, wherein each of said first units is comprised of: (a) an input section through which said first data relating to associated node is input into each of said first units; and (b) a data-storing section storing said first data having been input through said input section.

21. The apparatus as set forth in claim 20, wherein said second unit is comprised of a data-retrieving section which retrieves said first data stored in said data-storing section.

22. The apparatus as set forth in claim 20, wherein said second unit is comprised of: (a) an input section through which a condition for retrieving data is input into said first unit; (b) a data-retrieving section which retrieves data stored in said data-storing section of said first unit in accordance with said condition; (c) an assessing section which calculates total environmental load of said object product, based on said first data having been retrieved by said data-retrieving section; and (d) an output section which outputs said total environmental load.

23. An apparatus for assessing an amount of each of constituents of an object product, comprising:
  (a) a plurality of first units each collecting first data about environmental load at each of nodes relating to said object product, each of said first units being located at each of locations at which nodes relating to said object product are to be carried out; and
  (b) a single second unit retrieving said first data stored in each of said first units, and calculating an amount of each of constituents of said object product, based on said first data, wherein said first units for obtaining said first data are placed at said nodes not for obtaining data about environmental load of said object product but for obtaining data about environmental load for said nodes, wherein said nodes where said first units are placed include nodes of fabricating, processing, transporting, and disposing said object product.

24. The apparatus as set forth in claim 23, wherein said second unit is separately located from said first units.

25. The apparatus as set forth in claim 23, further comprising a network system through which said first units are connected to said second unit.

26. The apparatus as set forth in claim 23, wherein each of said first units is comprised of: (a) an input section through which said first data relating to associated node is input into each of said first units; and (b) a data-storing section storing said first data having been input through said input section.

27. The apparatus as set forth in claim 26, wherein said second unit is comprised of a data-retrieving section which retrieves said first data stored in said data-storing section.

28. The apparatus as set forth in claim 26, wherein said second unit is comprised of: (a) an input section through which a condition for retrieving data is input into said first unit; (b) a data-retrieving section which retrieves data stored in said data-storing section of said first unit in accordance with said condition; (c) an assessing section which calculates an amount of each of constituents of said object product, based on said first data having been retrieved by said data-retrieving section; and (d) an output section which outputs said total environmental load.

29. An apparatus for assessing total environmental load of an object product, comprising:
  (a) a plurality of first units each being located at each of nodes relating to said object product, and collecting first data about environmental load at each of said nodes; and
  (b) a second unit retrieving said first data stored in each of said first units, and calculating total environmental load of said object product,
  said first data including second data for retrieving data about environmental load of other node to which said each of nodes has a direct link,
  said second unit retrieving said first data directly associated with said object product, in accordance with a predetermined condition, and recursively retrieving other first data about environmental load, based on second data included in said first data having been retrieved, to thereby calculate total environmental load, wherein said first units for obtaining said first data are placed at said nodes not for obtaining data about environmental load of said object product but for obtaining data about environmental load for said nodes, wherein said nodes where said first units are placed include nodes of fabricating, processing, transporting, and disposing said object product.

30. The apparatus as set forth in claim 29, further comprising:
  (a) a network system through which said first units are connected to said second unit; and
  (b) an address administration server connected to said network system, said address administration server dealing with a network address of one of said first units, based on said second data.

31. The apparatus as set forth in claim 29, wherein said second unit is comprised of:
  (a) a data-storing section storing said first data therein;
  (b) a data-retrieving section retrieving said first data; and
  (c) an assessing section assessing said total environmental load, based on said second data included in said first data having been retrieved.

32. An apparatus for assessing an amount of each of constituents of an object product, comprising:
  (a) a plurality of first units each being located at each of nodes relating to said object product, and collecting first data about an amount of each of said constituents at each of said nodes; and
  (b) a second unit retrieving said first data stored in each of said first units, and calculating an amount of each of said constituents of said object product,
  said first data including second data for retrieving data about environmental load of other nod e to which said each o f nodes has a direct link,
  said second unit retrieving said first data directly associated with said object product, in accordance with a predetermined condition, and recursively retrieving other first data about environmental load, based on second data included in said first data having been retrieved, to thereby calculate an amount of each of said constituents, wherein said first units for obtaining said first data are placed at said nodes not for obtaining data about environmental load of said object product but for obtaining data about environmental load for said nodes, wherein said nodes where said first units are placed include nodes of fabricating, processing, transporting, and disposing said object product.

33. The apparatus as set forth in claim 32, further comprising:
(a) a network system through which said first units are connected to said second unit; and
(b) an address administration server connected to said network system, said address administration server dealing with a network address of one of said first units, based on said second data.

34. The apparatus as set forth in claim 32, wherein said second unit is comprised of:
(a) a data-storing section storing said first data therein;
(b) a data-retrieving section retrieving said first data; and
(c) an assessing section assessing said total environmental load, based on said second data included in said first data having been retrieved.

* * * * *